UNITED STATES PATENT OFFICE.

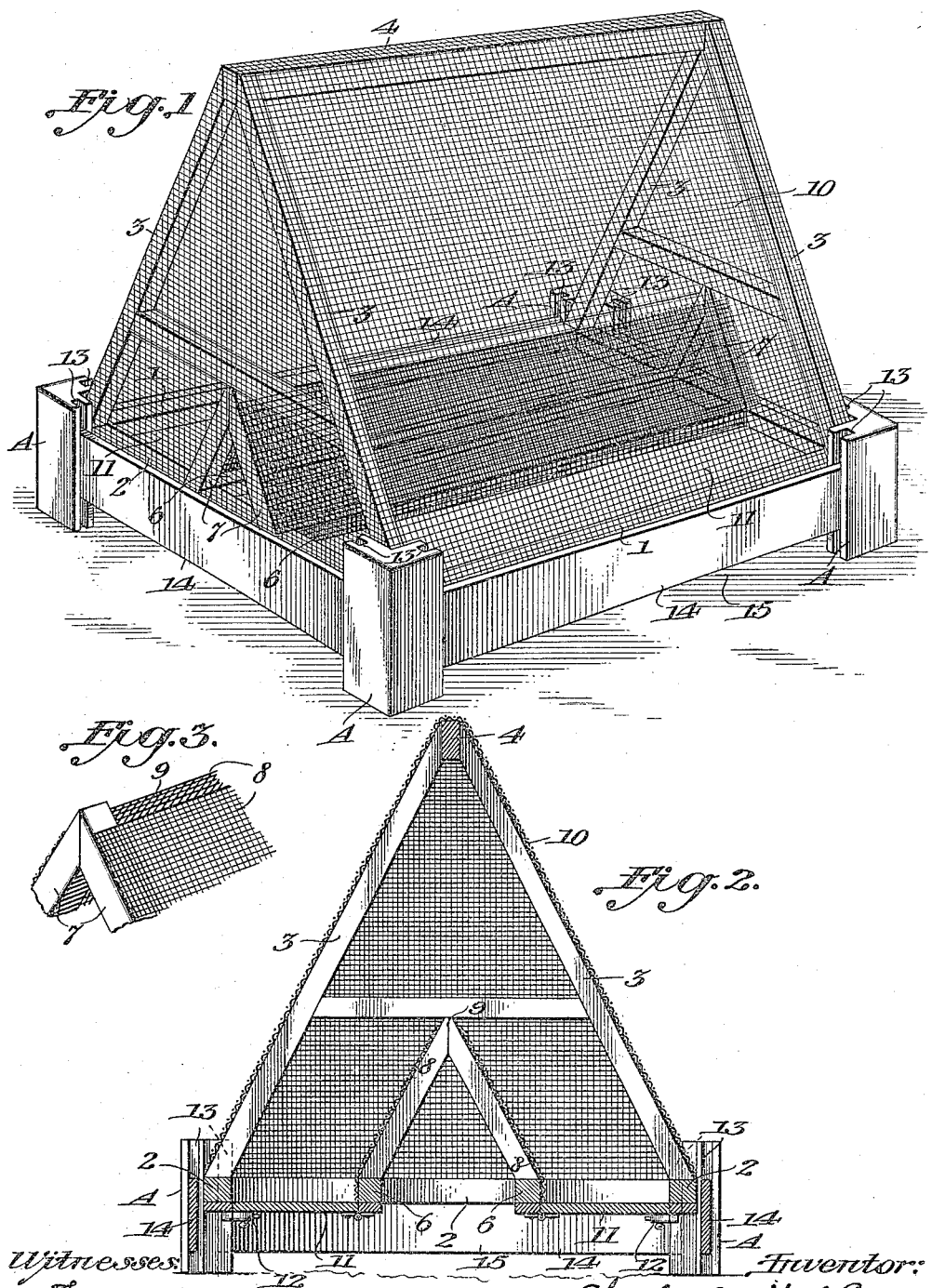

CHARLES MEDFORD CURRY, OF DOUGLAS, ARIZONA, ASSIGNOR OF ONE-FOURTH TO ALCINOUS YOUNG WRIGHT, OF DOUGLAS, ARIZONA.

FLY-TRAP.

1,167,339. Specification of Letters Patent. Patented Jan. 4, 1916.

Application filed October 10, 1914. Serial No. 866,077.

*To all whom it may concern:*

Be it known that I, CHARLES MEDFORD CURRY, citizen of the United States, residing at Douglas, in the county of Cochise and State of Arizona, have invented certain new and useful Improvements in Fly-Traps, of which the following is a specification.

This invention relates to an improvement in fly traps.

It has been found that if a cool dark space or chamber is provided with the trap, to which chamber the flies or insects have access, after gorging themselves, for instance, they will seek this chamber, and by providing an outlet through which the rays of light may enter, they will naturally pass through this outlet, and thereby become entrapped.

It is the object of this invention to provide such a means, and it consists of certain novel features of construction and combinations of parts which will hereinafter be more fully described and pointed out in the claims.

In the accompanying drawings: Figure 1 is a view in perspective; Fig. 2 is a transverse vertical sectional view; and Fig. 3 is a detail view.

A represents the posts, upon which are supported base bars 1, 1. Connected to these bars are transverse bars 2, 2. A-shaped frames 3, 3, extend from the corners and are connected at the upper end by the ridge-rail 4. Connected to the bars 2, 2 are longitudinal bars 6, 6. Rafters 7, 7, are erected on the bars 2, 2, and are connected together at their upper ends. Both frames thus constructed are covered with a wire netting 10 and 8 respectively. The upper edges of the netting 8 are not connected together, forming a longitudinal opening 9, through which the flies may pass in entering the trap.

The bottom of the trap is closed by two hinged doors 11, 11, with the exception of the space formed between the longitudinal bars 6. These doors 11 are fastened or maintained in a closed position by latches 12. The posts A are provided with vertical grooves 13, 13 for the reception of slides or gates 14, 14 for closing the ends and sides of the trap beneath the base members 1 and 2. These slides or gates are adapted to be raised a sufficient elevation to permit the insects to enter thereneath. The lower the slides or gates are maintained, the darker the space will be beneath the trap. The doors 11 and the slides or gates 14 coöperate for forming the dark chamber 15, in which the flies will enter before passing through the opening 9 of the trap.

It has been demonstrated that by placing this trap alongside a pile of refuse, the flies will pass beneath the sides, and eventually will pass through the opening 9 and into the trap, this being caused by the rays of light passing through the screen and into the chamber 15. The flies will naturally seek this outlet, rather than pass from the chamber 15 beneath the slides or gates 14. After the flies have entered the trap, they can be exterminated in any way and removed therefrom by opening the doors 11 in the bottom. If, however, it is desired, a bait, such as sugar, may be placed beneath the bottom or doors 11, and the flies will be attracted thereto, and will eventually pass up through the opening 9, the bait being placed upon the floor or table upon which the trap is resting.

To catch flies, it is necessary to provide some inducement for them to enter the trap. This is provided in the cool dark chamber 15 under the trap, and by the angular rays of light passing through the screen from two sides converging below the bottom, and increase the vision of the fly as he wishes to get out by going upward and into the trap.

When it is found desirable to bait the trap, the bait is generally sprinkled along the center and in the rays of light.

I claim:

1. A trap comprising a base composed of base bars and transverse bars, means for supporting the base away from the surface on which the trap is placed, two frames, one within the other supported on the base, said frames having reticulated material thereon, the inner frame having an opening at top and bottom, doors for closing the space at the bottom between the two frames, and means at the outer edges of the base for regulating the size of the space at the bottom and which with the doors create a darkened area on both sides of the light area beneath the bottom of the inner frame.

2. A trap, the base of which has an opening therein, means for supporting the base away from the surface on which the trap is placed, and means connected with the base for regulating the size of the space between the base and surface on which it rests for creating a darkened area between the opening and a side of the base.

3. In a trap, the combination of corner posts having vertical grooves therein, bars secured to the posts, and two A-shaped frames, one within the other supported by these bars, said frames having reticulated material thereon, the inner frame open at top and bottom, means closing the bottom of the outer frame, and gates slidable in the vertical grooves of the posts for regulating the space between them and the surface on which the trap rests.

In testimony whereof I affix my signature, in presence of two witnesses.

CHARLES MEDFORD CURRY.

Witnesses:
 DAVID A. RICHARDSON,
 S. W. WHITE.

Copies of this patent may be obtained for five cents each, by addressing the "Commissioner of Patents, Washington, D. C."